Oct. 23, 1962     E. P. BALDWIN ETAL     3,059,470
MULTIPLE PARTICULATE FLUID SAMPLER
Filed Aug. 17, 1959     5 Sheets-Sheet 1

INVENTORS
EDWARD P. BALDWIN
LEROY F. ENGLISH
BY
*George C. Sullivan*
Agent

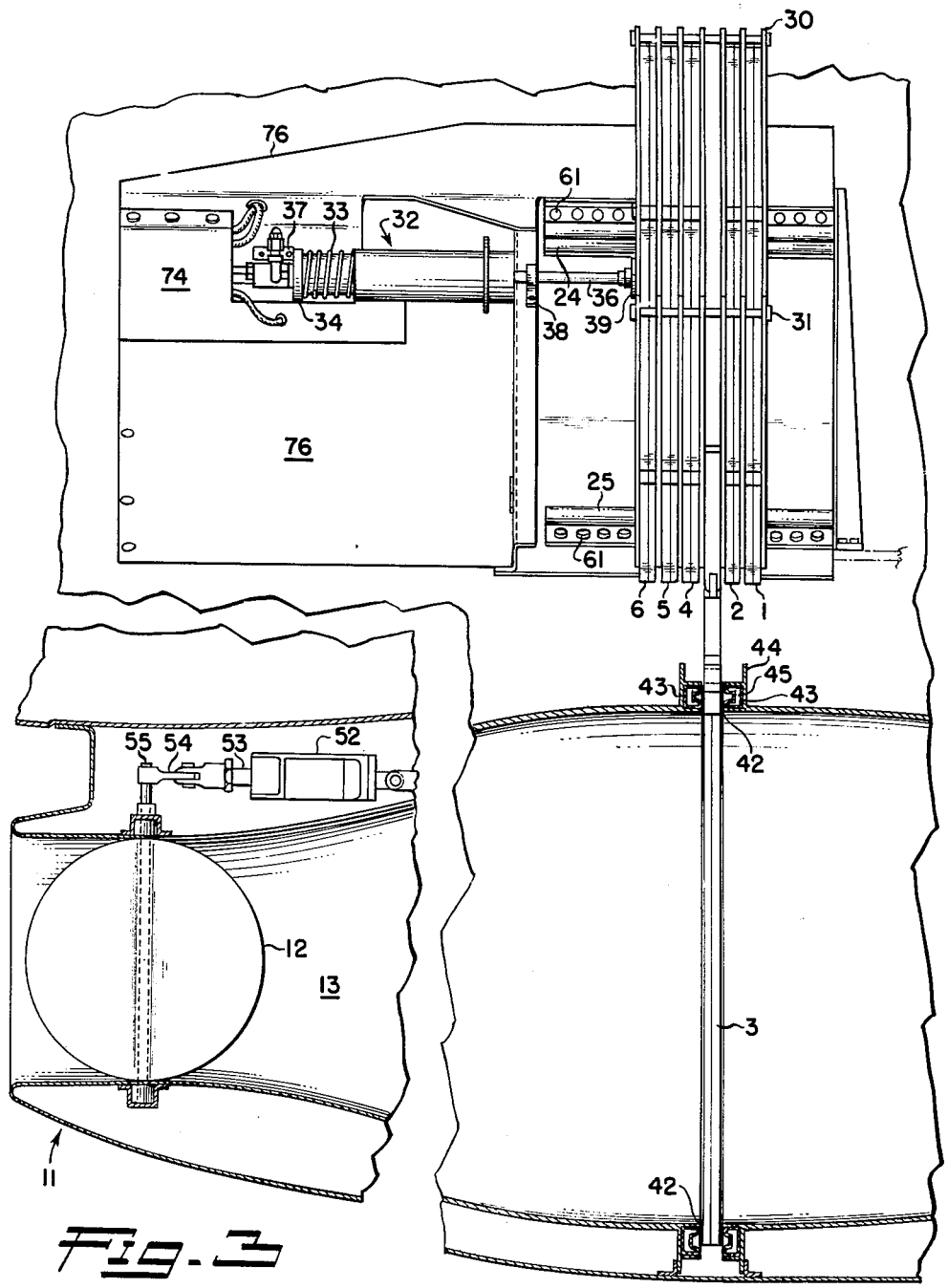

Oct. 23, 1962 E. P. BALDWIN ETAL 3,059,470
MULTIPLE PARTICULATE FLUID SAMPLER
Filed Aug. 17, 1959 5 Sheets-Sheet 3
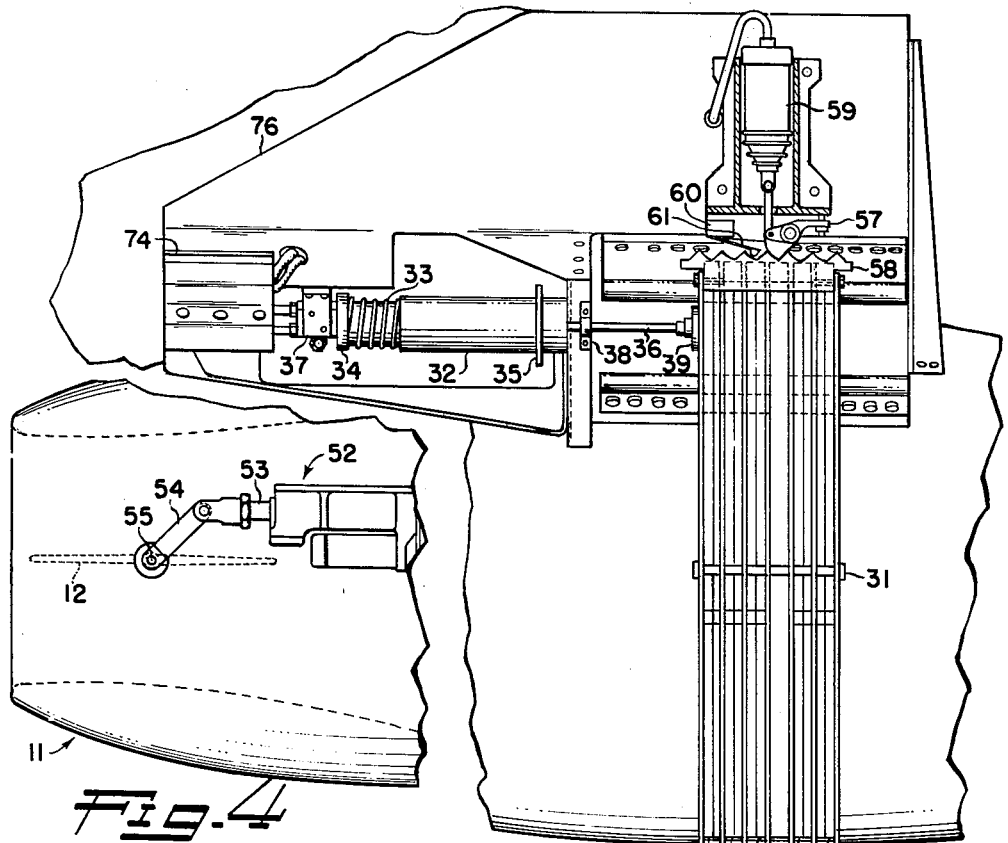
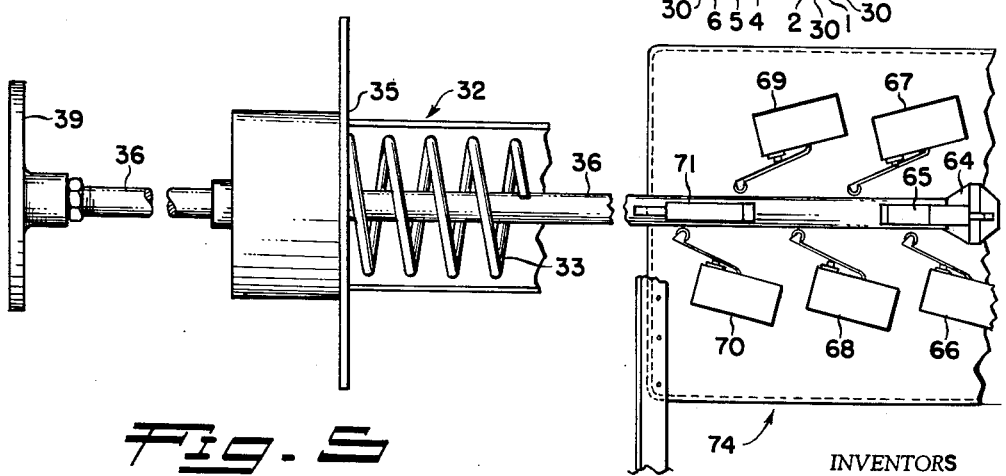
INVENTORS
EDWARD P. BALDWIN
LEROY F. ENGLISH
BY
*George C Sullivan*
Agent

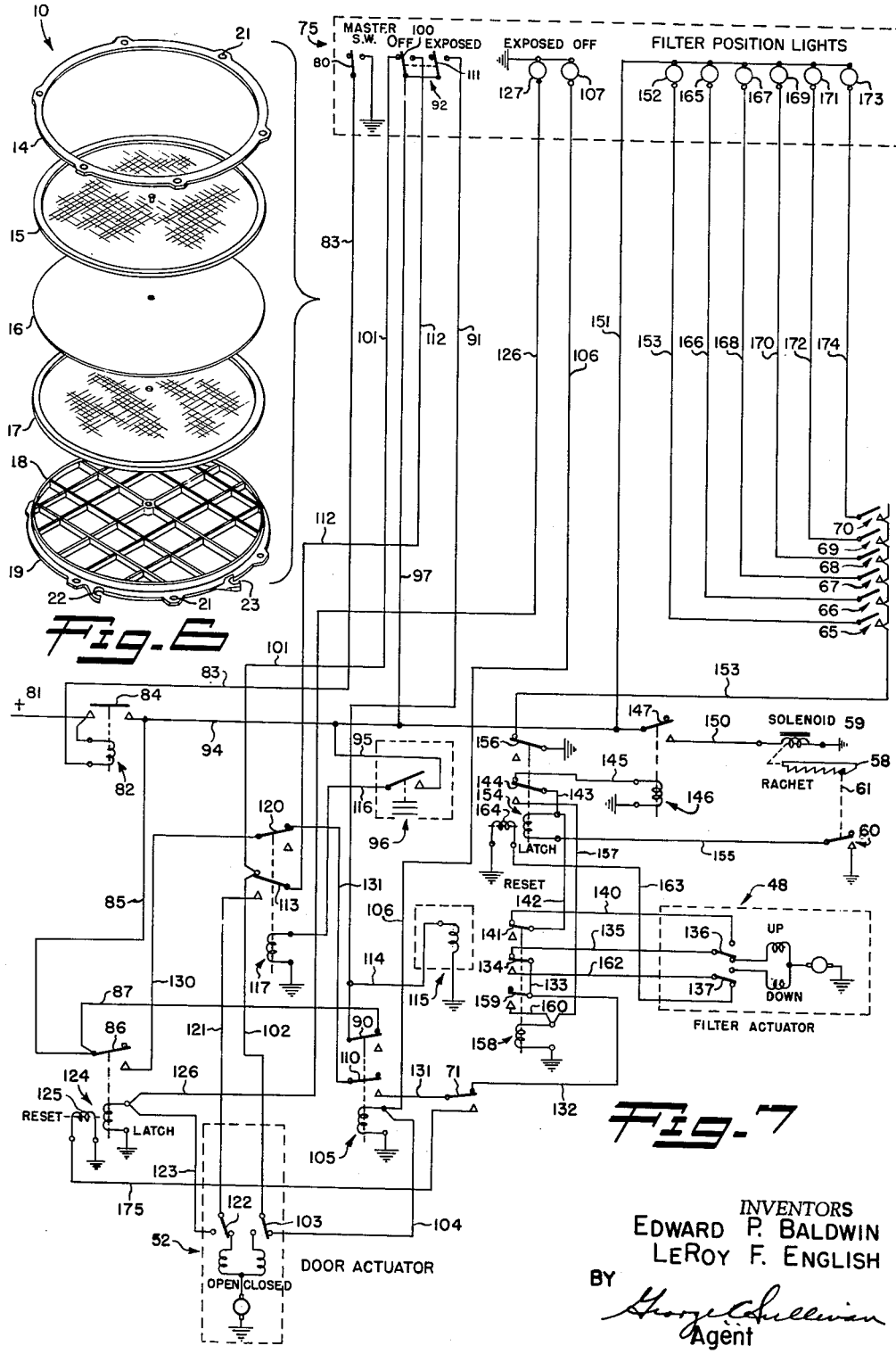

Oct. 23, 1962  E. P. BALDWIN ETAL  3,059,470
MULTIPLE PARTICULATE FLUID SAMPLER
Filed Aug. 17, 1959  5 Sheets-Sheet 5
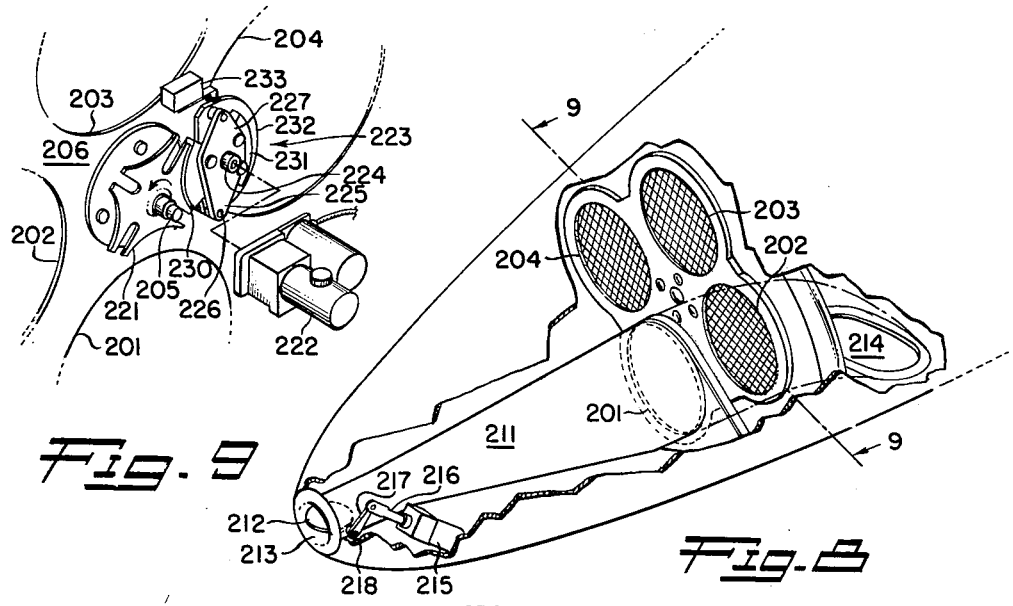
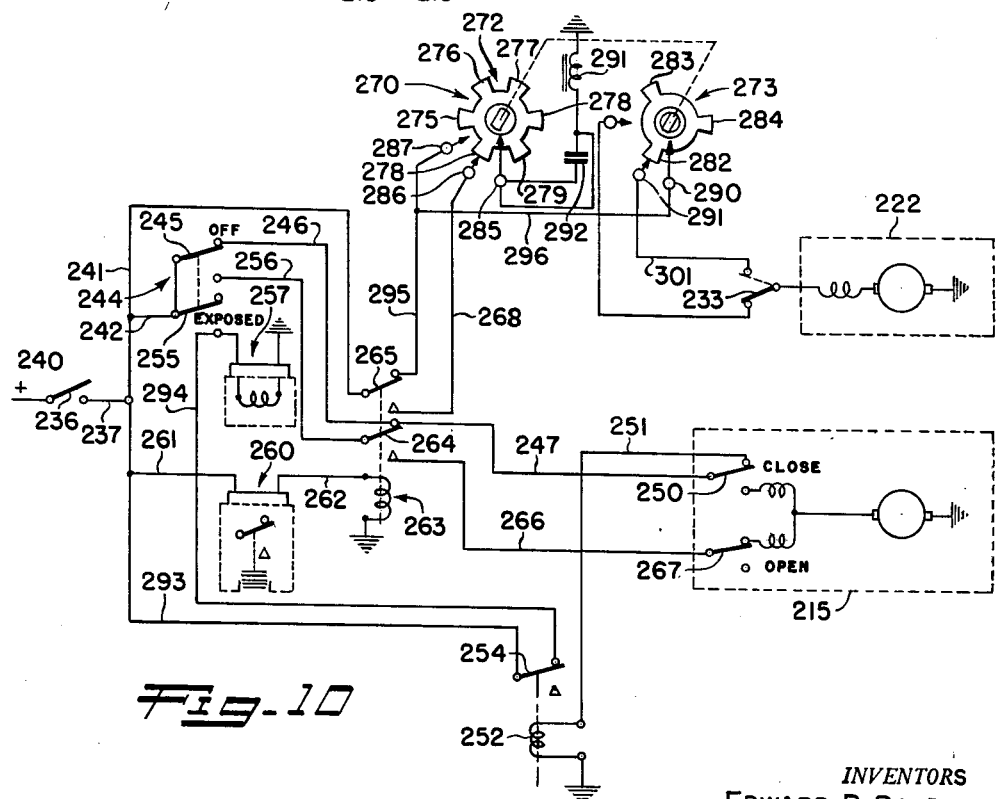
INVENTORS
EDWARD P. BALDWIN
LEROY F. ENGLISH
BY
*George C. Sullivan*
Agent

United States Patent Office 3,059,470
Patented Oct. 23, 1962

3,059,470
MULTIPLE PARTICULATE FLUID SAMPLER
Edward P. Baldwin, Granada Hills, and Le Roy F. English, Northridge, Calif., assignors to Lockheed Aircraft Corporation, Burbank, Calif.
Filed Aug. 17, 1959, Ser. No. 834,265
8 Claims. (Cl. 73—170)

This invention pertains to a device to take samples of particles from fluids. More particularly, it pertains to a device to take particulate samples from fluid by means of a filter system. Even more particularly, it relates to a device which will permit taking of several different samples of particles suspended in the fluid.

Prior to the present invention, the practice of taking samples of particles in a fluid involved providing duct means by which the fluid could be conducted to a filter, which would pick up particles and allow the fluid to pass. The filter was fixed in the duct and had to be manually removed after the taking of each sample. When there was involved the taking of several different samples of air at high altitudes by means of an aircraft, the aircraft had to land in order that ground personnel could remove the exposed filter and a new filter inserted before another sample could be taken. This involved a great deal of time.

An important object of the present invention is to provide a device or means by which several different samples may be taken without the necessity of stopping the transporting vehicle between samplings.

It is a further object to provide a means by which sampling filters may be exchanged while the transporting vehicle is in motion.

Still another object of this invention is to provide a device by which particles in any liquid medium may be sampled from either a moving or stationary transporting means. This transporting means may be an aircraft, a surface vehicle, an underwater vehicle, or a missile.

Further and other objects will become apparent from a reading of the following detailed description especially when considered in combination with the accompanying drawings.

FIG. 3 is a view partly broken away, taken on lines 3—3 of FIG. 2.

FIG. 4 is a view taken on lines 4—4 of FIG. 2 showing the filter indexing system.

FIG. 5 is a view taken on lines 5—5 of FIG. 2.

FIG. 6 shows an exploded view of the filter assembly.

FIG. 7 shows a circuit diagram of the electrical system of a device according to the present invention.

FIG. 8 shows a modified particulate fluid sampler.

FIG. 9 is a view taken on lines 9—9 of FIG. 8 showing the filter actuation means for the modified device.

FIG. 10 shows the circuit diagram for the device shown in FIG. 8.

Figure 1:
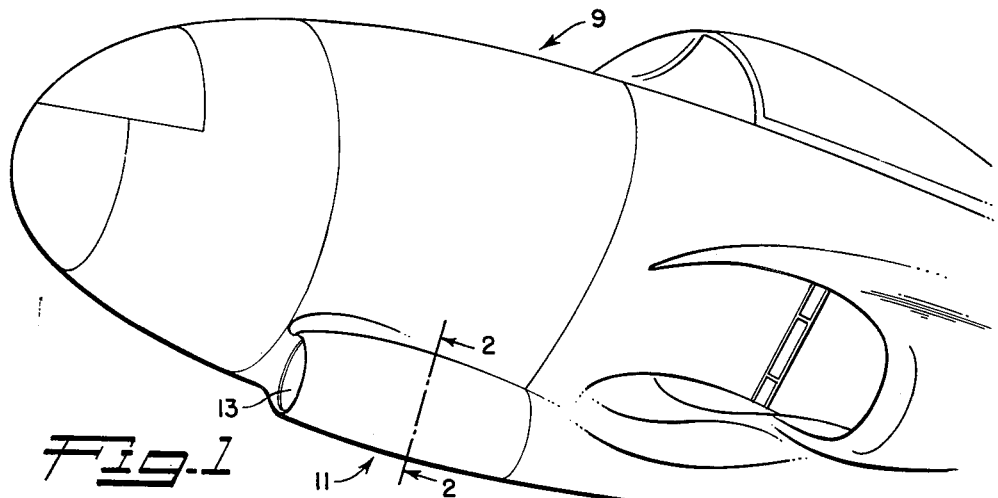
FIG. 1 shows how a device according to the present invention may appear on an aircraft.

For purposes of example, the present invention is shown mounted on an aircraft. It will be understood that the invention will not be limited to use on aircraft but may also be used on land, sea and under-sea vehicles, or in any position where the fluid to be sampled may be moved relative to the device.

The device, according to the present invention, which provides means to filter particles from fluid mediums is comprised of a filter assembly 10 mounted in a duct 11 having a door 12 which may be opened and closed to permit the fluid to pass through the duct from the entrance 13 to the exit (not shown). The filter assembly 10 is interposed in the duct so that all fluid passing through the duct must pass also through the filter which stops the particles in the fluid. The filter assembly 10 is comprised of a ring 14, a screen 15, a filter paper disk 16, another screen 17, a stiffener grid 18 and another ring 19. Rings 14 and 19 are provided with holes 21 by which the assembly may be bolted together. Hereafter, the filter assembly 10 will be referred to simply as a filter.

When a device, according to the present invention, is mounted on an aircraft, it is evident that the relative speed of the sampling device and the fluid medium, air in this case, from which it takes samples is quite high. The filter which intercepts the particles in this fluid medium is usually paper or some other fragile material. Because of this, there must be some means provided to decrease the velocity of the fluid medium so that the filter will not be destroyed. This is accomplished in the device shown by increasing the cross-sectional area of the duct 11 at the position occupied by the filter over that of the cross-sectional area of the entrance end of the duct. From FIG. 3, it can be seen that the radius of the duct interior at the point occupied by the filter is more than twice that of the duct entrance 13. Air velocity at the filter is thus reduced to less than one-fourth that at the entrance 13.

The device, according to the present invention, provides multiple filters by which several different samples may be taken. As shown in FIGS. 3 and 4, there are six filters which are numbered in the sequence of their use. FIG. 3 shows filter 3 in position in the duct and the door open, as they would appear in the sampling operation. Ring 19 of the assembly 10 is provided with open bearings 22 and 23 (FIGURE 6) by which the filter may be moved. Bearings 22 and 23 are mounted for sliding motion on rails 24 and 25, as seen in FIG. 3. Journals 27 and 28 of arm 26 have a cross-section identical to that of the rails 24, 25. When arm 26 is rotated about pivot 29 to its up position, as shown in FIG. 3, the journals 27 and 28 occupy interrupted areas the width of journals 27, 28 in the rails 24, 25. The filters 1 through 6 are mounted for sliding movement on rails 24, 25 and journals 27, 28. Impervious spacing plates 30 are interposed on both sides of each filter and are held together by bolts 31. Thus, the several filters are moved as a unit. The filters are moved along the rails by pusher assembly 32. Spring 33 provides the pusher assembly force in this instance. Instead of spring 33, there may be provided a hydraulic or electric motor or any other means of force which will move the filters from left to right, as shown in FIG. 3 or 4. Spring 33 reacts against bracket 34 and flange assembly 35. Rod 36 fixed to assembly 35 is caused to slide in bearings 37, 38. Plate 39 is fixed to rod 36 and to end spaced plate 30.

As can be seen from FIGS. 3 and 4, the several filters move in a path parallel to the axis of the duct through which the fluid medium is permitted to flow. Duct 11 has a circumferential opening 42 adjacent arm 26. On either side of the circumferential opening 42 about the exterior of the duct 11, there are tubular seals 43 which are retained on the exterior of the duct by retaining brackets 44. Each tubular seal 43 has a small nipple 45 facing either side of the filter which will contact the filter about its periphery when the seals are inflated by means not shown.

Filter actuator 48 through arm 49 pivoted to arm 26 rotates the arm 26 about its pivot 29, moving the filter from the rail position into the circumferential opening 42 in the duct 11. When the filter is sealed in position in the duct 11, the door 12 is opened by door actuator 52 which moves arm 53 pivoted to arm 54 which is fixed to shaft 55 of the door. The air is then permitted to flow through the duct, any particles being intercepted by the filter in the duct. Actuators 48 and 52 are shown here as reversible electric motors which drive worm gears to reciprocate arms 49 and 53 respectively.

Figure 2:
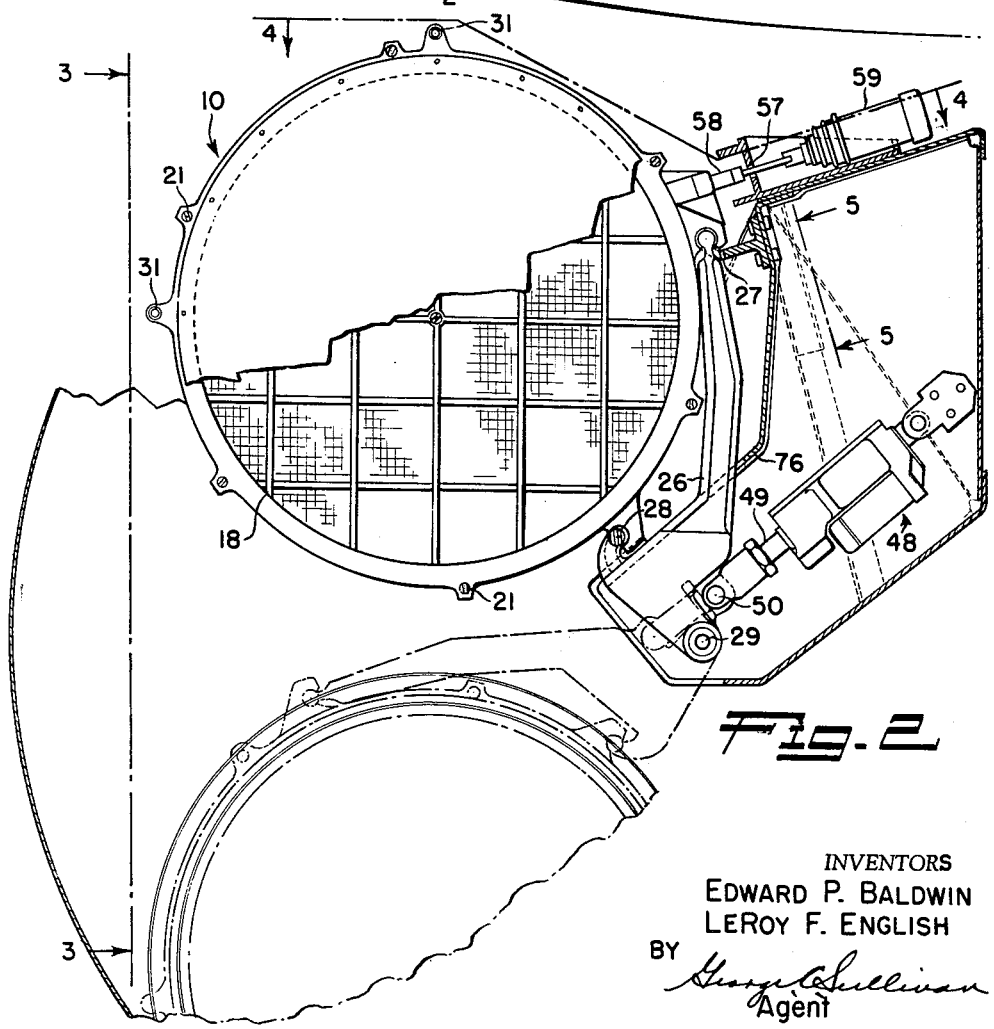
FIG. 2 is a view taken on lines 2—2 of FIG. 1 showing a filter retracted in full lines and extended into the duct in dotted lines.

Upon completion of taking of a sample of particles in the fluid, door 12 will be closed. The seals 43 will then be deflated and the exposed filter will be retracted through the action of actuator 48 by arm 26 to the full line position, as shown in FIG. 2. When the filter arrives in the up position, pawl 57 will be retracted from ratchet 58 permitting pusher 32 to move the filter group toward the right, as shown in FIGS. 3 and 4. Movement of the filter group will be restricted to the distance from one filter to the next because the circuit to solenoid 59 will be broken by microswitch 60 when its arm 61 rides to the top of one of the teeth of ratchet 58.

The rod 36 of pusher assembly 32 extends forward away from the filter assemblies and is equipped with a cam 64 on its forward end. This is clearly shown in FIG. 5 (which is reversed from the position occupied in FIG. 4). The forward end of shaft 36 is concealed in FIGS. 3 and 4 by housing 74. Cam 64 sequentially closes microswitches 65 through 71 as it moves aft. Each microswitch closes a circuit to a filter position light on the operator's control panel 75. Microswitch 65 is related to the first filter position light; microswitch 66 the second and so forth. Microswitch 71 closes when all filters have been used. The function of microswitch 71 will be later described. The cam 64 and the microswitches are located in housing 74. The device shown to illustrate the present invention is mounted to the aircraft by structure 76.

FIG. 7 shows the electrical circuits which operate the device given as an example of the present invention. Each cycle of operation consists of inflation of tubular seal 43 around the filter, opening of the door 12, taking of the sample, closing of the door, deflation of the seal, retraction of the exposed filter from the duct and movement of the next filter into position in the duct. At the beginning of taking of a series of different samples, the first filter is in place in the duct. Thus, in the example shown, filter number 1 will be in the duct 11. At this time, the door will be closed. Closing of master switch 80 will close the circuit from power source 81 through master relay 82, line 83, the switch 80 and to the ground, closing switch 84. A power source will then be provided through line 85, switch 86, line 87, switch 90, line 91 of the exposed-off switch 92. From the master switch 84 through line 94, power is made available through line 95 to pressure switch 96. Through line 97, power will be made available to the off side of the switch 92. The power is traced from switch 92, shown in its off position in FIG. 7, from line 97 through switch plate 100 in its left-hand position through line 101, line 102, limit switch 103 of the door actuator 52, line 104, energizing the door interlock relay 105 and through line 106 to the off light 107. Energization of the door closed interlock relay 105 will pull switch plates 110 and 90 to the down position. Cam 64 will, at this point, be in the position shown in FIG. 5, closing microswitch 65, igniting light 152 to give an indication on control panel 75 that filter 1 is in position.

At this point, the system is in condition to begin the sampling cycle. The exposed-off switch 92 is thrown to the exposed position, moving switches 100 and 111 toward the right, as seen in FIG. 7. Thus, a source of power will be made available to lines 112 and 91. Line 112 will supply power through switch 113 to line 102, switch 103, line 104 to the door closed interlock relay 105, maintaining switches 90 and 110 in their down position and the off light 107 on. Line 91 will supply power to line 114 and, in turn, the normally closed solenoid operated pressure valve 115. Energization of the solenoid of pressure valve 115 allows fluid pressure to flow to seals 43 from means not shown to seal the filter in the duct 11, as shown in FIG. 3. When the pressure builds up to the predetermined point at which the filter is sealed, the pressure switch 96 will close and power will be supplied through lines 94 from the master switch 84, line 95 through the pressure switch 96, line 116, and the pressure interlock relay 117. Pressure switch 96 can be an aneroid carrying a contact which will expand when pressure is supplied to it to move the contact against a fixed contact to close the circuit between lines 95 and 116. Energization of the relay 117 will cause plates 113 and 120 to be drawn down. This will supply a source of power from line 112 through switch 113, line 121 and limit switch 122, energizing the downwinding of the door actuator 52. Switches 103 and 122 of door actuator 52 are overcenter, snap acting and toggle operated. Arm 53 carries a lug (not shown) which contacts U-shaped toggles on switches 103 and 122 located near the extremities of movement of the lug. The lug contacts the far arm of each U-shaped toggle in the direction of its movement which, by the over center snap action of the switch, moves the other arm of the U-shaped toggle into the path of the lug so that it will be contacted on the return of arm 53 by the lug. As the rod 53 of the door actuator 52 begins its movement toward the door open position, it throws switch 103 to the left, as seen in FIG. 7. It will then be in position to energize the door closed winding to close the door when the door closed circuit is energized. When the door reaches the open position, as seen in FIGS. 3 and 4, switch 122 is thrown to the left by the lug on rod 53 at its extreme position, completing a circuit through line 123 to the door open relay 124. Energization of the relay 124 will cause its up biased armature to pull the switch 86 to its down position where it will be latched by the armature of reset relay 125 which is biased into a notch in the armature of relay 124. It will remain latched until the reset relay 125 is energized after exposure of all filters. Power will also be supplied through lines 126 to the exposed light 127. At this point, the filter will be sealed into position, the door will be open, air will be flowing through duct 11 and the filter will be stopping any particles in the fluid passing through the duct.

Upon the completion of the taking of a sample, the switch 92 is returned to its off position, moving plates 100 and 111 to the left, as shown in FIG. 7. Power will be supplied directly through lines 101 and 102 to switch 103 in the left position due to the action of the lug on arm 53, causing the door to close. At the beginning of the closing movement of arm 53 toward the left, as seen in FIG. 4, its lug will cause the switch 122 to move from the left to the right position shown in FIG. 7. Upon the completion of the travel of arm 53, at which time the door will be closed, switch 103 will be returned from the left to the position shown in FIG. 7. This will supply power through line 104 to the door closed interlock relay 105, pulling switches 90 and 110 to the down position. Up to this time, a source of power through line 85, line 87, switch 90 in its up position, line 114 has energized the pressure valve 115, maintaining the circuit closed through the pressure switch 96 which has maintained the pressure interlock relay 117 energized. Upon energization of the door closed interlock relay 105, the circuit to the pressure valve 115 will be broken by the downward movement of switch 90. Pressure will be released from the seals 43 until pressure switch 96 is opened by release of pressure from its aneroid de-energizing pressure interlock relay 117, returning switches 113 and 120 to their up position, as seen in FIG. 7. Switch 86 of the door open relay, having been latched down by the first opening of the door, will supply power through line 130, switch 120 in its up position, line 131, line 135, limit switch 136 of the filter actuator 48 which will energize the upwinding of the actuator 48, moving the filter to its up or solid line position shown in FIG. 2. Arm 49 of filter actuator 48 carries a lug which to operate overcenter snap acting switches 136 and 137 contacts U-shaped toggles in the same manner as are limit switches 103 and 122 in door actuator 52. Initial movement of arm 49 of the filter actuator 48 toward its up position causes limit switch 137 to move up. Upon completion of the travel of arm 49, switch 136 is moved to its upper position, completing a circuit through line 140, switch 141, line 142, line 143, switch 144, line 145 to the solenoid control relay 146. Energization of the relay 146 will pull switch 147 down. This closes a circuit from the main power source through the master switch 84, line 94 to the solenoid 59 through line 150. Energization of solenoid 59 withdraws the pawl 57 from the ratchet 58, allowing the pressure assembly 32 to move the filter group toward the right, as seen in FIGS. 3 and 4.

Movement of the ratchet 58 toward the right, as seen in FIGS. 3, 4 and 7 will cause microswitch 60 to be closed when the ratchet tooth moves the roller of arm 61. This completes a circuit from line 142 through the solenoid filter down interlock relay 154 and line 155. Down interlock relay and relay 164 operate in the same manner as relays 124, 125. Energization of the relay 154 will pull and latch the switches 144 and 156 down, breaking the filter position light circuit and completing circuit through line 143, switch 144, line 157 to the filter up-down relay 158. Actuation of the relay 158 will cause the switches 159, 134 and 141 to be pulled down. Power to operate solenoid 158 will now be supplied through line 132, switch 159, line 160. Power will also be supplied to line 132, line 133, switch 134, line 162 and switch 137 in its up position due to the action of the prior up movement of arm 49 of the filter actuator 48. The downwinding of the filter actuator 48 will be energized, causing filter 2 to be extended into the duct by arm 26. The switch 136 is returned to its down position by the movement of the arm 49 in the same manner that the arm 137 was moved up. Upon the completion of movement, the filter will be completely extended into the duct and arm 49 will cause switch 137 to be returned to its down position, breaking a circuit to the downwinding. In that position, power will be supplied through the switch 137, line 163, to the reset relay 164, releasing the latch of the solenoid down interlock relay 154, allowing the return of switches 144 and 154 to the up position.

Movement of the pressure assembly 32 will open microswitch 65, extinguishing light 152, closing microswitch 66 which will complete a circuit from line 151 to light 165, line 166, the switch 66, the line 153, the switch 156 to the ground, thus igniting light 165.

At this point, the system is in preparation for another taking of a sample. This is effected by moving the exposed-off switch 92 to the exposed position which again will cause the pressure valve 115 to be energized which will close the pressure switch 96, energizing the pressure interlock relay 117. After the pressure seals 43 have been inflated, the door will open in the manner described before.

After the last filter has been exposed, the cam 64 will close microswitch 71 which will break the power source to the filter actuation mechanism. A circuit will be completed through switch 71, line 175 to the reset relay 125, to release the latch of switch 86.

The purpose of this circuit is to allow the door 12 to be opened with all filters up in order that the duct 11 may be flushed after completion of the taking of a series of samples. The door is opened and closed in much the same manner as the previous sequence. The exposed-off switch 92 is moved to the exposed position, moving switches 110 and 111 toward the right in FIG. 7, completing a circuit through line 112, switch 113, line 102, switch 103, line 104 to the relay 105 pulling switches 90 and 110 down. Power is supplied through switch 111, line 91, line 114 to the pressure valve 115 which will close pressure switch 96, completing a circuit through line 95, line 116 and the solenoid 117 which will pull switches 113 and 120 down. Current will then be supplied from line 112 through switch 113, line 121 to the switch 122, energizing the open-winding of the door actuator 52. Switch 103 will be caused to be thrown to the left upon intial movement of rod 53, breaking the circuit to the solenoid 105. Upon completion of movement of rod 53, switch 122 will be thrown to the left, completing a circuit through line 123 and the relay 124, pulling switch 86 down. De-energization of solenoid 105 will cause switches 110 and 90 to return to their up position, completing a circuit through line 87, switch 90, line 114 to the valve 115. Valve 115 will pressurize seals 43, closing switch 96, completing a circuit to solenoid 117, pulling switches 113 and 120 down. Switch 86 will be latched down by the action of the solenoid 124. Because the cam 64 has moved microswitch 71 down, there will be no current to the filter actuator 48 nor to the solenoid 59. Thus, the filters will not be disturbed. Upon returning the exposed-off switch 92 to the off position, the current will be supplied to the closed winding of the door actuator 52 through switch 103, closing the door 12. With the doors closed, switch 103 will return to its right-hand position enregizing solenoid 105, pulling switches 90 and 110 down. The valve 115 will be de-energized allowing the seals 43 to deflate. It will be noted that the seals 43, having no filter interposed, will contact each other, preventing leakage from the duct 11 at the circumferential opening 42. Switch 110, when down, completes a circuit through line 131, switch 71, line 171 to the relay 125, releasing the latch, allowing return of switch 86 to the up position.

FIGS. 8, 9 and 10 show a modification of the filter system which involves using four filters on a rotating plate. The filters 201, 202, 203 and 204 are similar to the filter assembly 10, shown in FIG. 6, with the exception that there are no bearings 22 and 23. They are mounted for rotation about shaft 205 in plate 206. The direction of rotation of 206 about shaft 205 is clockwise, as seen in FIG. 8 and counterclockwise, as seen in FIG. 9. Duct 211 is closed at the inlet 213 by door 212 and has an exit 214. Door actuator 215 operates in much the same manner as actuator 52 through lug carrying arm 216, arm 217 to move the door 212 on its shaft 218. The filters are moved into and out of sampling position through rotation of the Geneva gear 221 by the filter actuator 222 which, through shaft 224, turns the plate 225 carrying rollers 226 and 227 which in turn rotate the Geneva gear 221 one step at a time. During the period that the actuator 222 is at rest, rotation of the Geneva gear 221 is prevented by cam plate 230 or 231. Cam 232 also on shaft 224 actuates two position microswitch 233 (to be later described).

FIG. 10 presents a simplified electrical control diagram to operate the modified device of FIG. 8. The sequence of operations is similar to the prior modification. There are seals provided on either side of the filter about the circumference of the duct on its exterior, in the same manner as seals 43. Thus, the door is closed, the filter is in the duct, and the seals are deflated. Actuation of the master switch 236 will supply power to line 237 from the main power source 240 which will apply power to line 241. Power in line 241 is supplied through line 242, switch 245, line 246, line 247, limit switch 250, line 251 to the door closed interlock relay 252. Actuation of the door closed interlock relay 252 will pull switch 245 down.

When it is desired to take samples, the switch 244 is thrown to the exposed position. Switches 245 and 255 are moved down. This will break the circuit through line 246 to the door closed interlock relay 252 but will complete it through line 256 and switch 264. Switch 255 in its lower position will complete a circuit to the pressure valve 257 (similar to valve 115), causing the seals to inflate around the filters in the duct 211. When the pressure is up, the pressure switch 260 (similar to pressure switch 96) will close to complete a circuit from line 261, line 262, to pressure relay 263. Energization of the pressure relay 263 will pull switches 264 and 265 down. Movement of switch 264 down will break the circuit to the relay 252, allowing the switches 253 and 254 to return to the up position. A circuit will be completed through switch 264 and line 266 to limit switch 267, energizing the open winding of the door actuator 215. Movement of arm 216 of the door actuator 215 causes limit switch 250 to move to its down position in the same manner as switches 103 and 122. Upon the completion of the motion of rod 216, switch 267 will be moved down, breaking the current to the open side of the winding. Movement of the switch 265 down completes a circuit to the rotary relay 270 through line 268. The rotary relay 270 is comprised of a shaft 271 on which are mounted two contactor plates 272 and 273. Contactor plate 272 has brush contacts 274 through 279 and contactor plate 273 has brush contacts 282, 283 and 284. Post 285 has a lead in continual contact with plate 272. Post 290 has a lead in continual contact wth contact plate 273. Energization of the relay 263 pulling switches 264 and 265 down will complete a circuit from line 241 through 265, line 268, post 286, contact plate 272, post 285 and the solenoid 291 which will cause the relay to rotate plate 272 and shaft 271 through a sixty degree arc, the distance between post 286 and 287. This will also cause brush plate 273, fixed to shaft 271, to rotate a like amount. Condenser 292 is provided in the solenoid circuit so as to retain power in the system until the contact plate 272 is rotated the distance from the post 286 to 287. Upon the completion of the taking of a sample, the switch 244 is moved to its up position, moving plates 245 and 255 up. This will complete a circuit through line 246, 247 to switch 250 in its down position due to the action of the rod 216 to close the door. Upon the initial movement of the rod 216, switch 267 will be moved to its up position. Upon the completion of the movement of the rod, switch 250 will be returned to its up position. Thus, power will then be supplied through line 251 to the relay 252 pulling switch 254 down breaking the circuit to the pressure valve 257. When the pressure is bled from the seals, the pressure switch 260 will be de-actuated, the relay 263 will be de-energized, allowing switches 264, 265 to return to their up position. Switch 265 in its up position will complete a circuit through line 241, 265, line 295 to the post 287, through the now adjacent brush contact 274, completing a circuit to the solenoid 291. The plate 273 is in such a position that contact 282 is half-way between post 291 and post 292 before this movement. A circuit will be completed from post 287 through contact 274 back through post 285 to the solenoid 291 causing another sixty degree movement. At the same time, a circuit will be completed through line 296 to post 290. Before the actuation of solenoid 291, the contact 274 will be moved off of post 287 and contact 282 of the plate 273 will be moved onto post 292, completing the circuit from line 296, post 290, contact plate 273, post 292, line 297, switch 233 and to the filter actuator 215 in the nose. The filter actuator 215 will continue to operate until microswitch 233 is moved to its upward position when it rides off of cam 232, at which time it will stop. In this position, cam plate 230 will prevent movement of Geneva gear 221 and filter number 2 will be fixed in duct 211 ready for the next sample taking cycle. The taking of the next cycle will be initiated by movement of the exposed-off switch to its downward position, thus completing the sequence of operations previously described.

Two devices, according to the present invention, have been disclosed by which samples of particles may be taken from a fluid medium. For purposes of example, the devices have been shown mounted on an aircraft. The invention, however, is not intended to be restricted to use on aircraft but may be used stationarily or on any moving platform, including missiles, water craft or land vehicles. The invention is further not intended to be restricted to any particular arrangement of parts or any specific method of operation or any of the various details thereof, even where specifically shown and described in this specification, as the same may be modified in various particulars or may be amplified or applied in many varied relations without departing from the spirit and scope of the claimed invention, practical considerations and constructions embodying certain details of the invention being illustrated and described but only for the purpose of complying with the requirements of the statutes for the disclosure of offering embodiments without attempting to disclose all of the various forms and modifications in which the invention might be embodied.

What is claimed is:

1. A device to sample particulate substances from a fluid medium comprising duct means having an inlet, an outlet and an intermediate area of greater cross section than said inlet, the intermediate area being formed with a circumferential opening, filter means of similar shape but having a larger area than said cross-sectional area at said circumferential opening, mounting means for said filter means having a rotational axis parallel to but removed from the axis of said duct means at said intermediate area, the distance from said rotational axis to said axis of said duct means being equal to the distance from said rotational axis to the center of said filter means, means to rotate said mounting means so that said filter will pass through said circumferential opening, means to stop rotation of said mounting means when the axis of said duct means and said center of said filter means coincide.

2. A device to sample particulate substances from a fluid medium comprising duct means having an inlet, an outlet and an intermediate area of greater cross section than said inlet, the intermediate area being formed with a circumferential opening, filter means of substantially similar shape and size, mounting means for said filter means having a rotational axis parallel to but removed from the axis of said duct means at said intermediate area, the distance from said rotational axis to said axis of said duct means being equal to the distance from said rotational axis to the center of said filter means, means to rotate said mounting means, so that said filter will pass through said circumferential opening, means to stop rotation of said mounting means when the axis of said duct means and said center of said filter means coincide, seal means adjacent and on either side of said circumferential opening, a manually operated switch, means to cause said seal means to contact said filter means when said manually operated switch is operated.

3. A device to sample particulate substances from a fluid medium comprising duct means having an inlet, an outlet and an intermediate area of greater cross section than said inlet, the intermediate area being formed with a circumferential opening, filter means of similar shape but having a larger area than said cross-sectional area at said circumferential opening, mounting means for said filter means having a rotational axis parallel to but removed from the axis of said duct means at said intermediate area, the distance from said rotational axis to said axis of said duct means being equal to the distance from said rotational axis to the center of said filter means, means to rotate said mounting means, so that said filter will pass through said circumferential opening, means to stop rotation of said mounting means when the aixs of said duct means and said center of said filter means coincide, seal means adjacent and on either side of said circumferential opening, a manually operated switch, means to cause said seal means to contact said filter means when said manually operated switch is operated, door means at said inlet, means responsive to contact of said seal means with said filter means to open said inlet door means.

4. A device to sample particulate substances from a fluid medium comprising duct means having an inlet, an outlet and an intermediate area of greater cross section than said inlet, the intermediate area being formed with a circumferential opening, filter means of substantially similar shape and size, mounting means for said filter means having a rotational axis parallel to but removed from the axis of said duct means at said intermediate area, the distance from said rotational axis to said axis of said duct means being equal to the distance from said rotational axis to the center of said filter means, means to rotate said mounting means, so that said filter will pass through said circumferential opening, means to stop rotation of said mounting means when the axis of said duct means and said center of said filter means coincide, seal means adjacent and on either side of said circumferential opening, a manually operated switch, means to cause said seal means to contact said filter means when said manually operated switch is operated in a first direction, means responsive to contact of said seal means with said filter means to open said inlet, means responsive to operation of said manually operated switch in a second direction to close said inlet, means responsive to closing of said inlet to release contact of said seal means from said filter means, means responsive to release of contact to actuate said rotating means to remove said filter means from said duct means.

5. A device to sample particulate substances from a fluid medium comprising duct means having an inlet, an outlet and an intermediate area of greater cross section than said inlet, the intermediate area being formed with a circumferential opening, filter means of similar shape but having a larger area than said cross-sectional area at said circumferential opening, mounting means for said filter means having a rotational axis parallel to but removed from the axis of said duct means at said intermediate area, the distance from said rotational axis to said axis of said duct means being equal to the distance from said rotational axis to the center of said filter means, means to rotate said mounting means, so that said filter will pass through said circumferential opening, means to stop rotation of said mounting means when the axis of said duct means and said center of said filter means coincide, seal means adjacent and on either side of said circumferential opening, a manually operated switch means to cause said seal means to contact said filter means when said manually operated switch is operated in a first direction, means responsive to contact of said seal means with said filter means to open said inlet, means responsive to operation of said manually operated switch in a second direction to close said inlet, means responsive to closing of said inlet to release contact of said seal means from said filter means, means responsive to release of contact to actuate said rotating means to remove said filter means from said duct means, means responsive to removal of said filter means from said duct means to cause another filter means to be moved into said duct means.

6. A device to sample particulate substances in a fluid medium comprised of duct means having an inlet and an outlet and an intermediate area of larger cross section than said inlet, the intermediate area being formed with a circumferential opening, tubular seal means surrounding said duct on either side of said circumferential opening, said inlet having door means, plural filter means each larger than but similar in cross section to the cross section of said duct means at said circumferential opening, rotatable means to insert said filter means into said duct means through said circumferential opening so that all fluid passing from said inlet to said outlet must pass through said filter means, a manually operated switch, means to inflate said seal means against said filter means about its periphery when said manually operated switch is operated in a first direction, means responsive to the inflation of said seal means to open said door means, means responsive to operation of said manually operated switch in a second direction to close said door means, means responsive to the closing of said door means to deflate said seal means, means responsive to deflation of said seal means to actuate said rotatable means to remove said filter from said duct means.

7. A device to sample particulate substances in a fluid medium comprised of duct means having an inlet and an outlet and an intermediate area of larger cross section than said inlet, the intermediate area being formed with a circumferential opening, tubular seal means surrounding said duct means and said circumferential opening, said inlet having door means, plural filter means each larger than but similar in cross section to the cross section of said duct means at said circumferential opening, actuator means to move said filter means into said duct means through said circumferential opening so that all fluid passing from said inlet to said outlet must pass through said filter means, a manually operated switch, means to inflate said seal means against said filter means about its periphery when said manually operated switch is operated in a first direction, means responsive to inflation of said seal means to open said inlet door means, means responsive to operation of said manually operated switch in a second direction to close said door means, means responsive to the closing of said door means to deflate said seal means, means responsive to deflation of said seal means to energize said actuator means to withdraw said filter means from said duct means, means responsive to said withdrawal of said filter means from said duct means to move said filter means away from said circumferential opening including a shaft having a cam surface and plural microswitch means, means to cause said microswitch means to close when said cam on said shaft is adjacent microswitch means, means responsive to closing of said microswitch means to actuate remote indicating means.

8. A device to sample particulate substances in a fluid medium comprised of duct means having an inlet and an outlet and an intermediate area of larger cross section than said inlet, a circumferential opening in said intermediate area, tubular seal means surrounding said duct means on either side of said circumferential opening, said inlet having a door means, plate means mounted for rotation on a rotational axis parallel to the axis of said duct means at said circumferential opening, said plate having a radius larger than the distance from said rotational axis to the opposite side of said duct means, said plate having plural openings equal to said cross section of said duct means at said circumferential opening and each equidistant from said rotational axis, filter means in said openings, intermittent means to rotate said plate, means to stop said plate so that one of said openings is coincident with said duct means, a manually operated switch, means to inflate said seal against said plate when said manually operated switch is operated in a first direction, means responsive to the inflation of said seal means to open said inlet door, means responsive to operation of said manually operated switch in a second direction to close said door, means responsive to the closing of said door to deflate said seal means, means responsive to the deflation of said seal means to energize said intermittent means to rotate said plate to the next adjacent opening in said plate.

References Cited in the file of this patent
UNITED STATES PATENTS

| | | |
|---|---|---|
| 2,645,941 | Reid | July 21, 1953 |
| 2,790,253 | Ayer | Apr. 30, 1957 |
| 2,826,075 | Vernier | Mar. 11, 1958 |